(12) United States Patent
Kreder et al.

(10) Patent No.: US 7,568,350 B2
(45) Date of Patent: Aug. 4, 2009

(54) COMBUSTION CHAMBER FOR A TURBOMACHINE

(75) Inventors: Olivier Kreder, Chailly En Biere (FR); Guillaume Sevi, Ivry sur Seine (FR); Delphine Hermance Maxime Parent, Montrouge (FR)

(73) Assignee: SNECMA, Paris (FR)

( * ) Notice: Subject to any disclaimer, the term of this patent is extended or adjusted under 35 U.S.C. 154(b) by 344 days.

(21) Appl. No.: 11/468,637

(22) Filed: Aug. 30, 2006

(65) Prior Publication Data

US 2007/0044474 A1    Mar. 1, 2007

(30) Foreign Application Priority Data

Aug. 31, 2005    (FR)    ................................... 05 08891

(51) Int. Cl.
  *F02C 7/20*    (2006.01)
(52) U.S. Cl. ........................................................ 60/796
(58) Field of Classification Search .................... 60/782, 60/752, 796, 754, 798, 804
See application file for complete search history.

(56) References Cited

U.S. PATENT DOCUMENTS

| 5,000,005 | A | * | 3/1991 | Kwan et al. ................... 60/757 |
| 6,131,384 | A | | 10/2000 | Ebel |
| 2006/0010879 | A1 | * | 1/2006 | Aumont et al. ............... 60/796 |

FOREIGN PATENT DOCUMENTS

| EP | 1 265 037 A1 | 12/2002 |
| EP | 1 593 913 A1 | 11/2005 |
| FR | 2 356 000 | 1/1978 |
| GB | 1578474 | * 11/1980 |

* cited by examiner

*Primary Examiner*—Michael Cuff
*Assistant Examiner*—Andrew Nguyen
(74) *Attorney, Agent, or Firm*—Oblon, Spivak, McClelland, Maier & Neustadt, P.C.

(57) ABSTRACT

Combustion chamber for a turbomachine, comprising a chamber endwall equipped with fuel injection means and axisymmetric walls connecting the chamber endwall to internal and external flanges for fastening to internal and external casings, these flanges including annular portions pierced by orifices of triangular or approximately triangular shape for the flow of air for cooling downstream components.

16 Claims, 3 Drawing Sheets

COMBUSTION CHAMBER FOR A TURBOMACHINE

BACKGROUND OF THE INVENTION

The present invention relates to a combustion chamber for a turbomachine, such as an aircraft turbojet or turboprop.

DESCRIPTION OF THE PRIOR ART

Such a combustion chamber comprises a chamber endwall, which carries fuel injection systems and is formed with air intake orifices, this chamber endwall being joined by internal and external axisymmetric walls to internal and external annular flanges for fastening to internal and external casings of the turbomachine, via means of the bolt-nut type or the like.

In operation, a portion of the air stream delivered by a feed compressor for the combustion chamber must bypass the combustion chamber in order to cool components located downstream of this chamber, and to do this it passes through orifices formed in the internal and external flanges of the chamber.

These orifices are machined in annular portions of the flanges centered on the axis of the chamber and are usually rectangular or circular in shape.

Orifices of rectangular shape make it possible to further reduce the mass and provide a larger air flow area. However, these flanges formed with rectangular orifices have an inferior resistance to vibrational stresses, while flanges having circular orifices have a better vibration resistance, but they provide a lower air flow area with an increase in pressure drop in the flow of air for cooling the components located downstream.

The object of the present invention is in particular to provide a simple, effective and inexpensive solution to this problem, by combining the advantages of these two known solutions, while avoiding their drawbacks.

SUMMARY OF THE INVENTION

The subject of the invention is, for this purpose, a combustion chamber for a turbomachine, such as an aircraft turbojet or turboprop, comprising a chamber endwall equipped with fuel injection means and axisymmetric walls connecting the chamber endwall to internal and external flanges for fastening to internal and external casings, these flanges having annular portions pierced by orifices for the flow of air for cooling downstream components, wherein the orifices of at least one of the flanges are of triangular or approximately triangular shape.

The invention provides the or each flange formed with triangular orifices with a large air flow area and with a low mass, like a flange having rectangular orifices, while still having good vibration resistance and good circumferential stiffness, like a flange with circular orifices.

The shapes and dimensions of the triangular orifices and their arrangement in the annular portions of the flanges are optimized in order for the following objectives to be effectively met:
  a maximum air flow area and a minimum pressure drop;
  good resistance to vibrational stresses and good circumferential stiffness;
  a reduced flange mass; and
  simple and easy machining of the orifices in the flange.

The triangular orifices may be isosceles triangles, equilateral triangles or triangles of any shape, and they preferably each have rounded apexes so as to reduce the stress concentrations at the apexes of the triangular orifices.

Advantageously, the successive triangular orifices are arranged in a staggered and head-to-tail configuration so as to optimize the air flow area and to reduce the mass. In this configuration, the triangular orifices are separated from one another by a strip of material that extends in a zig-zag fashion between the internal and external edges of the annular portion of the flange. This makes it possible to increase the circumferential stiffness of the flange relative to a flange pierced by rectangular orifices, in which flange the strips of material separating the orifices extend radially between the internal and external edges of the annular flange portion.

In one embodiment of the invention meeting the aforementioned objectives, the triangular orifices of one flange comprise two rows of identical triangular orifices, in which the orifices each have a base located on a circumference centered on the axis of the chamber, the orifices being reversed from one row to another and the two rows being partially imbricated one in the other.

In order for the flange formed with triangular orifices to have a sufficient circumferential stiffness, the circumferential distance between the bases of the triangular orifices of any one row is equal to or greater than 1.5 times the width of the strip of material that separates two successive orifices.

The degree of partial imbrication of the two rows is determined by the ratio $H_2/H_1$, where $H_1$ is the distance between the base of a triangular orifice and its apex and $H_2$ is the radial distance between the apexes of two successive orifices, opposite their bases, this ratio $H_2/H_1$ being equal to or greater than 0.6 in order to optimize the air flow area.

The length of the straight portion of the strip of material between the rounded apexes of two successive orifices must be equal to or less than three times the width of this strip so that the flange has good mechanical strength in bending.

The angle at the apex of the triangular orifices, opposite their bases, must be equal to or greater than 20°.

The bases of the orifices are separated from the internal and external edges of the annular flange portion by strips of material having a circumferential orientation, the radial widths of which are defined by $a = d$ and $b = H_2$, where $a$ is the radial width of the strip of material between the base of a triangular orifice of the outer row and the external edge of the annular flange portion, $d$ is the width of the strip of material separating successive orifices, $b$ is the radial width of the strip of material between the base of a triangular orifice of the inner row and the internal edge of the annular flange portion, and $H_2$ is the radial distance between the apexes of two successive orifices, opposite their bases.

The invention also relates to a turbomachine, such as an aircraft turbojet or turboprop, which includes a combustion chamber of the type described above.

BRIEF DESCRIPTION OF THE DRAWINGS

The invention will be more clearly understood and other features, details and advantages thereof will become more clearly apparent on reading the following description, given by way of nonlimiting example and with reference to the appended drawings in which.

DESCRIPTION OF THE PREFERRED EMBODIMENTS

Figure 1:
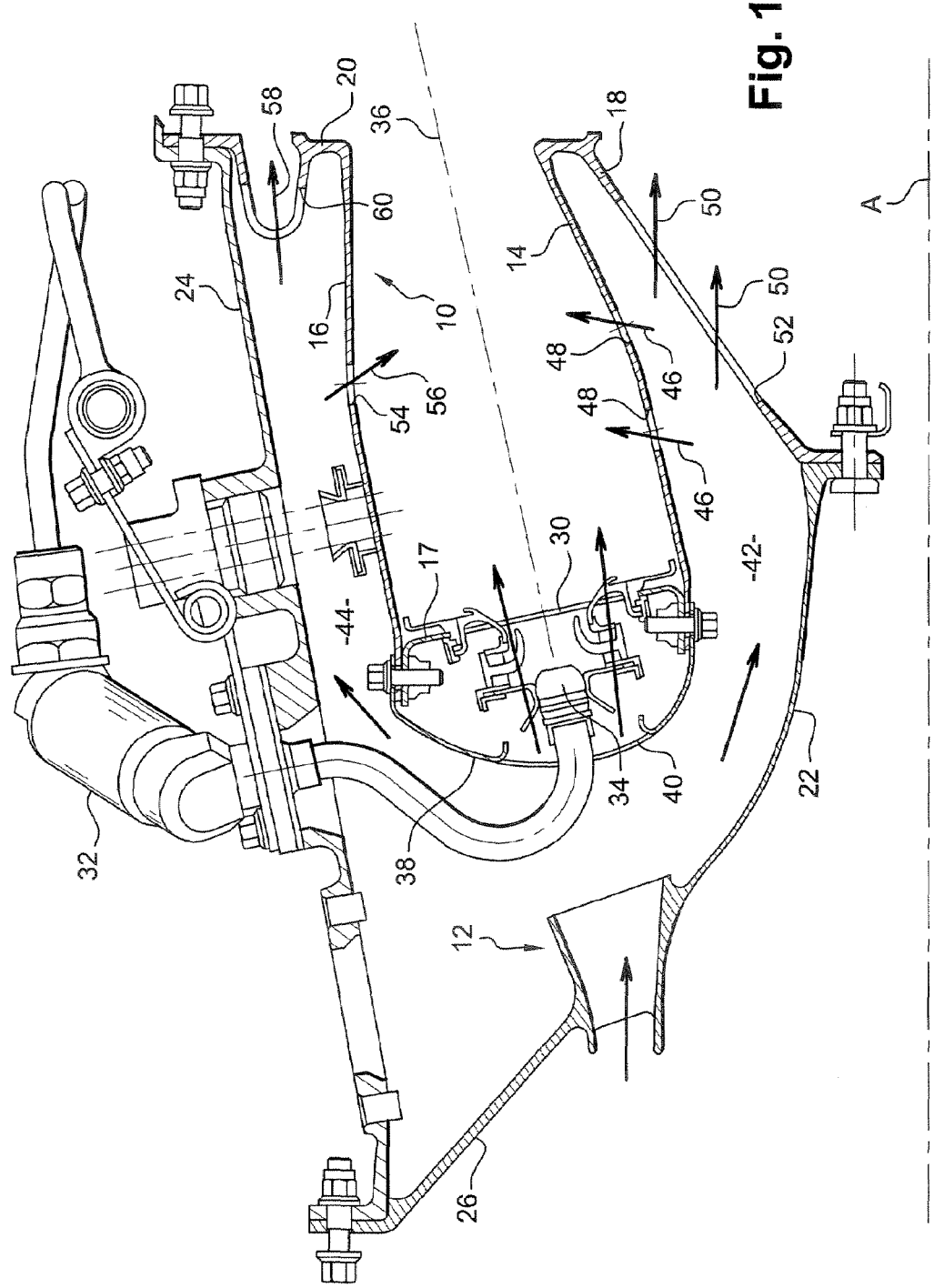
FIG. 1 is a schematic half-view, in axial section, of a diffuser and of a combustion chamber of a turbomachine.

In FIG. 1, the combustion chamber 10 is placed at the outlet of a diffuser 12, which is itself located at the outlet of a compressor (not shown), and comprises an axisymmetric internal wall 14 and an axisymmetric external wall 16 connected upstream to an annular chamber endwall 17 and fastened downstream by internal and external annular flanges 18, and 20 respectively to an internal frustoconical shell 22 of the diffuser and to a downstream end of an external casing 24 of the chamber, the upstream end of this casing 24 being fastened to an external frustoconical shell 26 of the diffuser.

The chamber endwall 17 includes orifices 30 through which air from the diffuser 12 and fuel fed by injectors 32 passes, said injectors being fastened to the external casing 24 and uniformly distributed around a circumference about the longitudinal axis A of the chamber. Each injector 32 comprises a fuel injection head 34 mounted on the chamber endwall 17 and aligned with the axis 36 of one of the orifices 30 of this endwall. An annular shroud 38, curved toward the upstream end, is fastened to the upstream ends of the walls 14, 16 and 17 of the chamber and includes air flow orifices 40 aligned with the orifices 30 in the chamber endwall 17.

One portion of the air stream delivered by the compressor and exiting the diffuser 12 passes through the orifices 40 and 30 and feeds the combustion chamber 10, the other portion of the air stream feeding the internal 42 and external 44 annular channels for bypassing the combustion chamber 10.

The internal channel 42 is formed between the internal shell 22 of the diffuser 12 and the internal wall 14 of the chamber, and the air that passes into this channel is divided into a stream 46, which penetrates the chamber 10 via holes 48 in the internal wall 14, and into a stream 50, which passes through the orifices 52 in a frustoconical annular portion of the internal flange 18 so as to cool components (not shown) located downstream of this chamber.

The external channel 44 is formed between the external casing 24 and the external wall 16 of the chamber, and the air that passes into this channel is divided into a stream 56, which penetrates the chamber 10 via holes 54 in the external wall 16, and into a stream 58 that passes through the orifices 60 in a U-shaped curved annular portion of the external flange 20 so as to cool components downstream.

The air flow holes 48 and 54 in the chamber are dilution holes, called primary holes, and holes formed by multiperforations.

In the known technique, the orifices 52, 60 of the flanges 18, 20 are of rectangular or circular shape and do not allow the cooling air flow area and the mass of the flanges to be optimized, while still maintaining good resistance to vibrational stresses and good circumferential stiffness and limiting the pressure drops of the air flow through the orifices in the flanges.

Figure 2:
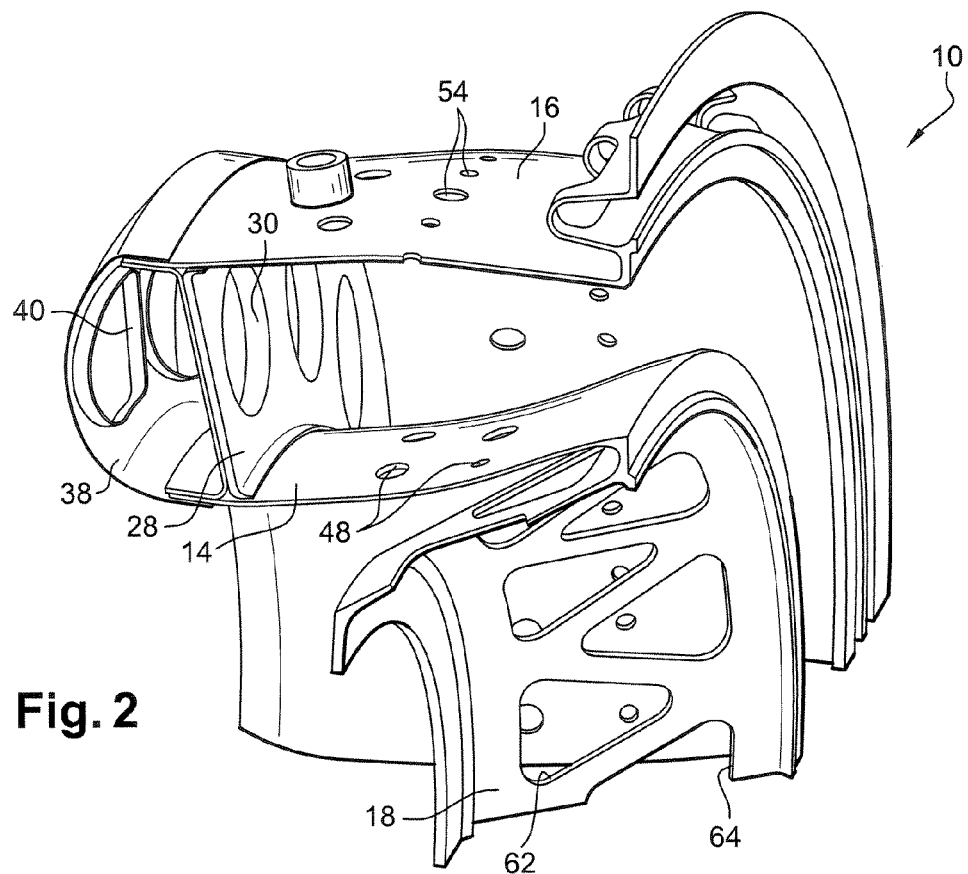
FIG. 2 is a partial schematic view, in perspective, of a combustion chamber of a turbomachine according to one embodiment of the invention.
Figure 3:
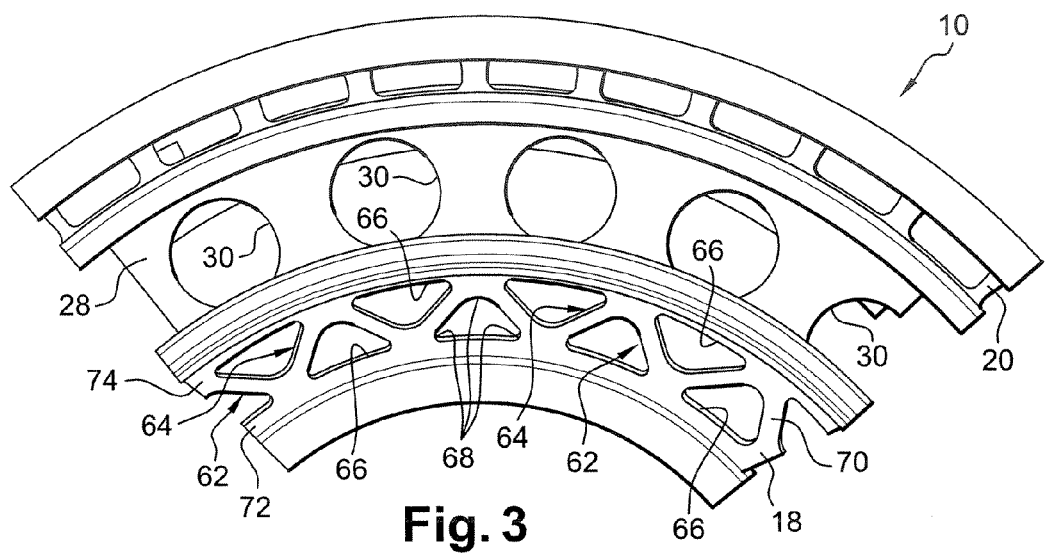
FIG. 3 is a partial front view of the combustion chamber of FIG. 2.
Figure 4:
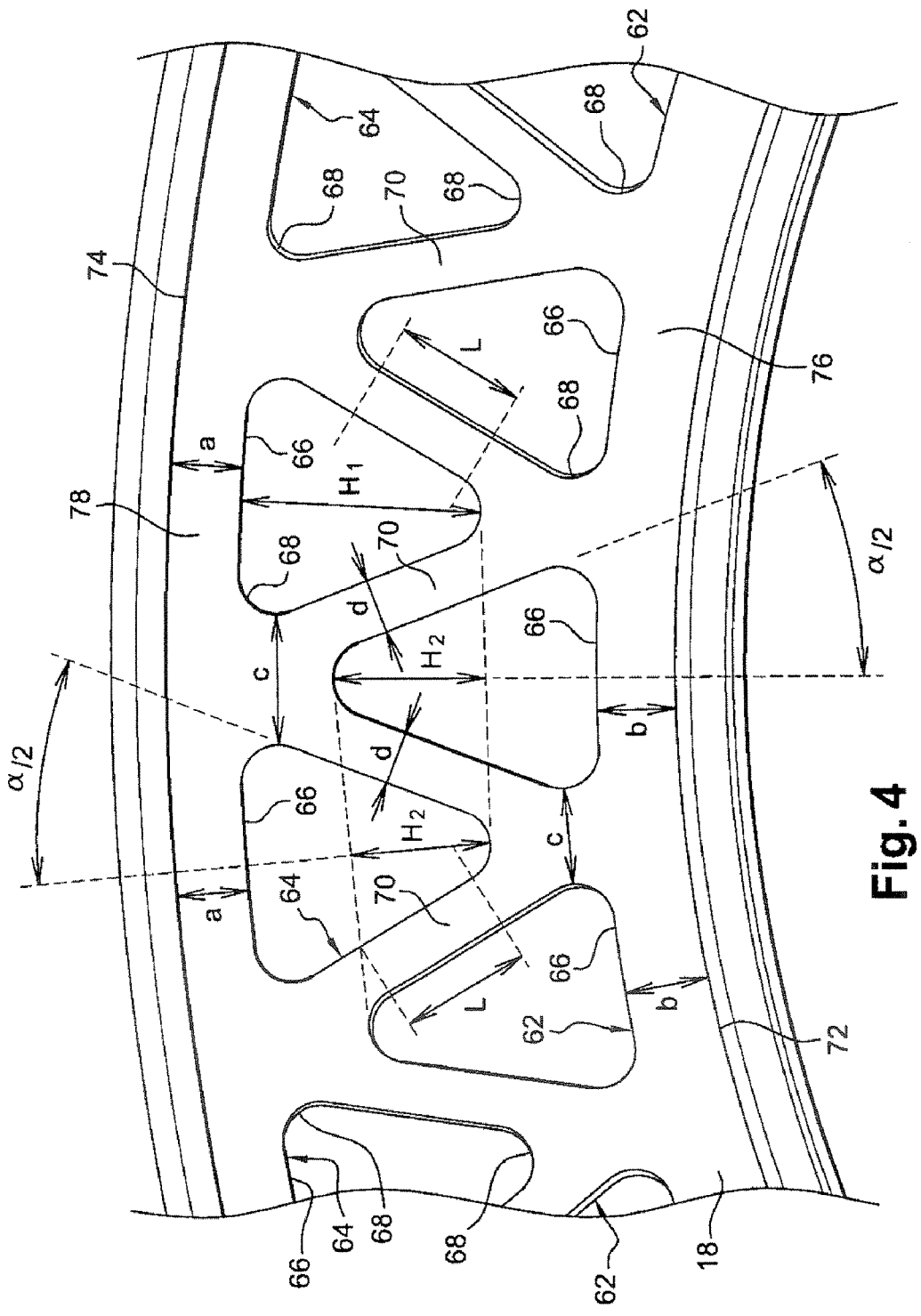
FIG. 4 is a partial front view of the internal annular flange of the combustion chamber of FIG. 2.

In the combustion chamber according to the invention shown in FIGS. 2 to 4, the internal flange 18 includes, in its frustoconical annular portion, orifices 62, 64 of triangular shape that are arranged in two mutually imbricated coaxial annular rows.

The triangular orifices 62 of the inner row are isosceles triangles and each has a base 66, located on a circumference centered on the axis A of the chamber, and rounded apexes 68, their apex opposite their base being directed toward the outside of the chamber.

The triangular orifices 64 of the outer row are identical to the orifices 62 and are arranged in a staggered and inverted or head-to-tail configuration with the orifices 62, that is to say the base 66 of each orifice 64 is located on an outer circumference centered on the axis A of the chamber and their apex opposite their base is directed toward the inside of the chamber.

The two rows of triangular orifices 62, 64 are at least partly imbricated in one another and the orifices 62, 64 are separated from one another by a strip of material 70 that extends in a zig-zag manner between the internal edges 72 and external edges 74 of the annular flange portion.

Parameters have been defined that characterize the shapes and the dimensions of the orifices 62, 64 and also their relative arrangement, which make the axial and circumferential stiffnesses of the flange 18 vary. These parameters have been optimized for the flange 18 so that the latter can provide a large air flow area while still maintaining good vibratory strength and good circumferential stiffness and limiting the pressure drops as the air flows through the orifices 62, 64.

The angle $\alpha$ at the apex of the triangular orifices opposite their bases must preferably be equal to or greater than 20°.

The strip of material 70 that extends in a zig-zag manner between the internal 72 and external 74 edges of the annular flange wall includes straight portions that separate the parallel sides of the successive orifices 62, 64 and connect the rounded apexes 66 of the orifices, opposite their bases. Denoting the width and the length of these straight portions by d and L, respectively, it is preferable for the length L to be equal to or less than three times the distance d so that the flange has good mechanical strength in bending.

The circumferential distance between the bases of the successive triangular orifices of any one row is denoted by c. In the example shown, this distance is identical for the inner and outer rows of triangular orifices. This distance c must preferably be equal to or greater than 1.5 times the aforementioned distance d so that the flange retains sufficient circumferential stiffness.

$H_1$ denotes the height of a triangular orifice 62, 64, that is to say the distance between the base 66 of an orifice and the apex 68 opposite this base, and $H_2$ denotes the radial distance between the apexes 68 of two successive orifices 62, 64 opposite their bases. To optimize the air flow area, it is necessary for the degree of partial imbrication of the two rows, determined by the ratio $H_2/H_1$, to be equal to or greater than 0.6.

The inner and outer rows of orifices are separated from the internal 72 and external 74 edges of the annular portion of the flange by circumferentially oriented strips of material 76, 78.

The radial widths of the strips of material 76 and 78 located between the base 66 of an orifice 64 of the outer row and the external edge 74 of the annular portion, and between the base 66 of an orifice 62 of the inner row and the internal edge 72 of the annular portion, are denoted by a and b respectively. The width a must be equal to or greater than the aforementioned distance d and the width b must be equal to or less than the aforementioned distance $H_2$ so that the flange 18 has sufficient flexibility to damp the thermal expansions and deformations in operation.

The external flange 20 may also be pierced by triangular orifices 62, 64 like the internal flange, or it may be the only flange to include triangular orifices.

Moreover, the triangular orifices in the flanges may be of any shape, but still being arranged in a staggered and head-to-tail configuration in order to reduce the mass and the pressure drop.

The triangular orifices in the flanges can be produced by milling cutting or by laser cutting.

The invention claimed is:

1. A combustion chamber for a turbomachine, such as an aircraft turbojet or turboprop, comprising:
a chamber endwall equipped with fuel injection means and axisymmetric walls connecting the chamber endwall to internal and external flanges for fastening to internal and external casings,
said flanges having annular portions pierced by orifices for the flow of air for cooling downstream components,
wherein the orifices of at least one of the flanges are of triangular or approximately triangular shape, and
the triangular orifices of one flange comprise two rows of triangular orifices, in which the orifices each have a base located on a circumference centered on the axis of the chamber, the orifices being reversed from a first row to a second row and the first row is partially imbricated in the second row, wherein the bases of the orifices of the first row are axially offset from the apexes of the orifices of the second row,
wherein the degree of partial imbrication of the two rows is determined by a ratio $H_2/H_1$, where $H_1$ is a distance between the base of a triangular orifice and its opposite apex and $H_2$ is the radial distance between the apexes of two successive orifices, opposite their bases, this ratio $H_2/H_1$ being equal to or greater than 0.6.

2. The combustion chamber as claimed in claim 1, wherein the triangular orifices are formed in the internal flange.

3. The combustion chamber as claimed in claim 1, wherein the triangular orifices are formed in the external flange.

4. The combustion chamber as claimed in claim 2, wherein triangular orifices are formed in the external flange.

5. The combustion chamber as claimed in claim 1, wherein the triangular orifices each have a rounded apex.

6. The combustion chamber as claimed in claim 1, wherein the triangular orifices are isosceles triangles or equilateral triangles.

7. The combustion chamber as claimed in claim 1, wherein a circumferential distance c between the bases of the triangular orifices of any one row is equal to or greater than 1.5 times a width d of the strip of material that separates two successive orifices.

8. The combustion chamber as claimed in claim 5, wherein a length L of a straight portion of the strip of material between the rounded apexes of two successive orifices is equal to or less than three times a width d of this strip.

9. The combustion chamber as claimed in claim 1, wherein an angle $\alpha$ at the apex of the triangular orifices, opposite their bases, is equal to or greater than 20°.

10. A turbomachine, such as an aircraft turbojet or turboprop, which includes a combustion chamber as claimed in claim 1.

11. The combustion chamber as claimed in claim 1, wherein the shape of the triangular orifice consists of three flat edges connected by three arcs.

12. The combustion chamber as claimed in claim 1, wherein the triangular orifices are identical.

13. The combustion chamber as claimed in claim 1, wherein the ratio $H_2/H_1$ is lower than 1.

14. The combustion chamber as claimed in claim 1, wherein the ratio $H_2/H_1$ is equal to about 0.6.

15. The combustion chamber as claimed in claim 1, wherein the triangular orifices are formed in a frustoconical or radial annular portion of said flange, and
the bases of the orifices are separated from the internal and external edges of said annular portion by strips of material having a circumferential orientation,
wherein a radial width of the strip of material between the base of a triangular orifice and the external edge of the annular flange portion is equal to or greater than a width of the strip of material separating successive orifices, and
a radial width of the strip of material between the base of a triangular orifice and the internal edge of the annular flange portion is equal to or less than a radial distance between the apexes of two successive orifices.

16. A combustion chamber for a turbomachine, such as an aircraft turbojet or turboprop, comprising:
a chamber endwall equipped with fuel injection means and axisymmetric walls connecting the chamber endwall to internal and external flanges for fastening to internal and external casings,
said flanges having annular portions pierced by orifices for the flow of air for cooling downstream components,
wherein the orifices of at least one of the flanges are of triangular or approximately triangular shape, and
the triangular orifices of one flange comprise two rows of triangular orifices, in which the orifices each have a base located on a circumference centered on the axis of the chamber,
the orifices being reversed from a first row to a second row and the first row is partially imbricated in the second row, wherein the bases of the orifices of the first row are axially offset from the apexes of the orifices of the second row, wherein the triangular orifices are formed in a frustoconical or radial annular portion of said flange, and
the bases of the orifices are separated from the internal and external edges of said annular portion by strips of material having a circumferential orientation, wherein a radial width of the strip of material between the base of a triangular orifice and the external edge of the annular flange portion is equal to or greater than a width of the strip of material separating successive orifices, and
a radial width of the strip of material between the base of a triangular orifice and the internal edge of the annular flange portion is equal to or less than a radial distance between the apexes of two successive orifices.

* * * * *